United States Patent
Kaufman et al.

(10) Patent No.: US 8,159,939 B1
(45) Date of Patent: Apr. 17, 2012

(54) DYNAMIC NETWORK CONGESTION CONTROL

(75) Inventors: Matthew Kaufman, Bonny Doon, CA (US); Michael Thornburgh, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 167 days.

(21) Appl. No.: 12/463,323

(22) Filed: May 8, 2009

(51) Int. Cl.
*H04J 1/16* (2006.01)
(52) U.S. Cl. ......... 370/229; 370/230; 370/231; 370/235
(58) Field of Classification Search .................. 370/229, 370/230, 230.1, 231, 232, 233, 23, 235, 236, 370/236.1, 241, 252, 328, 389; 709/203, 709/220, 223, 224, 225, 226, 227, 228, 229, 709/230, 235
See application file for complete search history.

(56) References Cited

U.S. PATENT DOCUMENTS

| | | | | |
|---|---|---|---|---|
| 6,646,987 B1 * | 11/2003 | Qaddoura | ...................... | 370/231 |
| 6,876,952 B1 * | 4/2005 | Kappler et al. | ............... | 702/187 |
| 6,958,997 B1 * | 10/2005 | Bolton | ........................... | 370/392 |
| 7,035,214 B1 * | 4/2006 | Seddigh et al. | ................ | 370/231 |
| 7,304,948 B1 * | 12/2007 | Ong | ............................ | 370/230.1 |
| 7,882,207 B1 * | 2/2011 | Titmuss et al. | ............... | 709/223 |
| 2002/0150048 A1 * | 10/2002 | Ha et al. | ........................ | 370/231 |
| 2003/0046336 A1 * | 3/2003 | D'Annunzio et al. | ........ | 709/203 |
| 2003/0063564 A1 * | 4/2003 | Ha et al. | ........................ | 370/230 |
| 2004/0196785 A1 * | 10/2004 | Janakiraman et al. | ........ | 370/229 |
| 2004/0264370 A1 * | 12/2004 | Moon et al. | ..................... | 370/229 |
| 2005/0068911 A1 * | 3/2005 | Miyake et al. | ................ | 370/299 |
| 2006/0039285 A1 * | 2/2006 | Chapman et al. | .............. | 370/235 |
| 2006/0251011 A1 * | 11/2006 | Ramakrishnan et al. | ...... | 370/328 |
| 2007/0070906 A1 * | 3/2007 | Thakur | .......................... | 370/235 |
| 2007/0079327 A1 | 4/2007 | Khoo et al. | | |
| 2007/0091934 A1 * | 4/2007 | Myles et al. | ................... | 370/503 |
| 2007/0223379 A1 * | 9/2007 | Sivakumar et al. | ............ | 370/235 |
| 2007/0226365 A1 | 9/2007 | Hildreth et al. | | |
| 2007/0280905 A1 | 12/2007 | Li et al. | | |
| 2007/0282905 A1 | 12/2007 | Karlberg | | |
| 2009/0063975 A1 | 3/2009 | Bull et al. | | |
| 2009/0287826 A1 * | 11/2009 | Kaufman et al. | ............. | 709/227 |
| 2010/0057928 A1 * | 3/2010 | Kapoor et al. | ................ | 709/231 |
| 2010/0226250 A1 * | 9/2010 | Plamondon | .................... | 370/230 |

OTHER PUBLICATIONS

"Real—Time Media Flow Protocol Frequently Asked Questions— External", Jul. 2$^{nd}$, 2008. http://download.macromedia.com/pub/labs/flashplayer10/flashplayer10__rtinfp__faq__070208.pdf (accessed on May 8, 2009).

(Continued)

*Primary Examiner* — Aung S Moe
*Assistant Examiner* — Abdullah Riyami
(74) *Attorney, Agent, or Firm* — Fish & Richardson P.C.

(57) ABSTRACT

Methods, systems, and apparatus, including computer programs encoded on a computer storage medium, can include transmitting data packets on multiple flows through a network to an endpoint in accordance with a congestion window where each flow is assigned a different priority level for transmission and a corresponding different congestion window adjustment technique for use with that flow, monitoring for acknowledgements in response to the transmitted data packets; determining, based on a result of the monitoring, a delivery status for one or more of the transmitted data packets that corresponds to one of the multiple flows; and adjusting, responsive to the determined delivery status for the one flow, the congestion window based on the delivery status and the congestion window adjustment technique corresponding to the one flow.

20 Claims, 7 Drawing Sheets

OTHER PUBLICATIONS

J. Postel, "RFC 768: User Datagram Protocol", Aug. 28, 1980.
M. Allman, V. Paxson, W. Stevens, "RFC 2581: TCP Congestion Control", Apr. 1999.
"Move Adaptive Stream," Move Networks, Inc., retrieved from Internet on Aug. 29, 2008: http://www.movenetworks.com/wp-content/uploads/move-adaptive-stream.pdf, 4 pages.
"Move Media Player," Move Networks, Inc., retrieved from Internet on Aug. 29, 2008: http://www.movenetworks.com/wp-content/uploads/move-media-player.pdf, 3 pages.
"Move Networks Solutions," Move Networks, Inc., retrieved from internet on Aug. 29, 2008: http://www.movenetworks.com/why-move/solutions, 4 pages.
"Our Clients," Move Networks, Inc., retrieved from Internet on Aug. 29, 2008: http://www.movenetworks.com/why-move/our-clients, 3 pages.
Birney, Bill, "Intelligent Streaming," Microsoft Corporation, May 2003, retrieved from internet: http://www.microsoft.com/windows/windowsmedia/howto/articles/intstreaming.aspx?pf=true, 7 pages.

* cited by examiner

DYNAMIC NETWORK CONGESTION CONTROL

BACKGROUND

This specification relates to managing network congestion. A communication network, including a packet-switched network such as an Internet Protocol (IP) based network, may experience congestion at one or more different places within the network. For example, several endpoints, such as networked computers, may overload a network by sending data packets to a specific endpoint at an aggregate rate in excess of a network bandwidth available to the specific endpoint. In such a scenario, data packets may be dropped by a router on the network when an aggregate of incoming data rates exceeds a threshold. When data packet loss occurs, an endpoint can lower a data transmission rate to a specific endpoint to mitigate network congestion.

Network protocols, e.g., Transmission Control Protocol (TCP) or Real-Time Media Flow Protocol (RTMFP), operating over a packet-switched network can implement congestion control in order to avoid overloading the network when sufficient capacity is not available. For example, TCP implementations use a congestion control algorithm based on packet loss after a congestion event occurs. A congestion control algorithm can increase or decrease a congestion window based on network congestion or a lack thereof. The congestion window can limit an outstanding amount of unacknowledged data packets. TCP implementations can use an additive increase-multiplicative decrease (AIMD) algorithm to adjust a congestion window. An AIMD algorithm can increase a congestion window linearly as successful acknowledgements arrive, and can decrease the congestion window, e.g., decrease the congestion window by half, when a packet loss occurs. RTMFP implementations can use different AIMD congestion responses.

SUMMARY

This specification describes technologies relating to network congestion management.

Methods for managing network-based congestion can include transmitting data packets on multiple flows through a network to an endpoint in accordance with a congestion window where each flow is assigned a different priority level for transmission and a corresponding different congestion window adjustment technique for use with that flow; monitoring for acknowledgements in response to the transmitted data packets; determining, based on a result of the monitoring, a delivery status for one or more of the transmitted data packets that corresponds to one of the multiple flows; and adjusting, responsive to the determined delivery status for the one flow, the congestion window based on the delivery status and the congestion window adjustment technique corresponding to the one flow. The congestion window can limit an outstanding amount of unacknowledged transmitted data packets. Other implementations can include corresponding systems, apparatus, and computer programs, configured to perform the actions of the methods, encoded on computer storage devices.

These and other implementations can include one or more of the following features. Adjusting the congestion window can include adjusting a segment of the congestion window associated with the one flow. A congestion window can include multiple segments corresponding to different priority levels. Some implementations can include identifying one of the multiple flows that is ready to send data to the endpoint; determining an amount of data for transmission based on the congestion window and an unacknowledged data packet count; transmitting one or more data packets, each including data associated with the identified flow, in accordance with the determined amount of data for transmission; and incrementing the unacknowledged data packet count based on a result of the transmitting one or more data packets. Determining the amount of data for transmission can include computing a sum of one or more segments of the congestion window that correspond to a priority level equal to or less than the identified flow's priority level, where the congestion window can include multiple segments corresponding to different priority levels. Transmitting data packets on multiple flows can include transmitting data based on a User Datagram Protocol (UDP). Transmitting data packets on multiple flows can include transmitting data in accordance with a Real-Time Media Flow Protocol (RTMFP). Transmitting data packets on multiple flows can include transmitting data packets on three or more flows, where adjusting the congestion window can include using three or more different congestion window adjustment techniques to effect adjustments to the congestion window, where the three or more flows respectively map to the three or more different congestion window adjustment techniques.

Particular embodiments of the subject matter described in this specification can be implemented so as to realize one or more of the following advantages. The technologies described herein can enable better and/or more appropriate network usage by one or more traffic classes. They can enable better and/or more appropriate network usage when additional competing non-associated flows are being sent and received.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
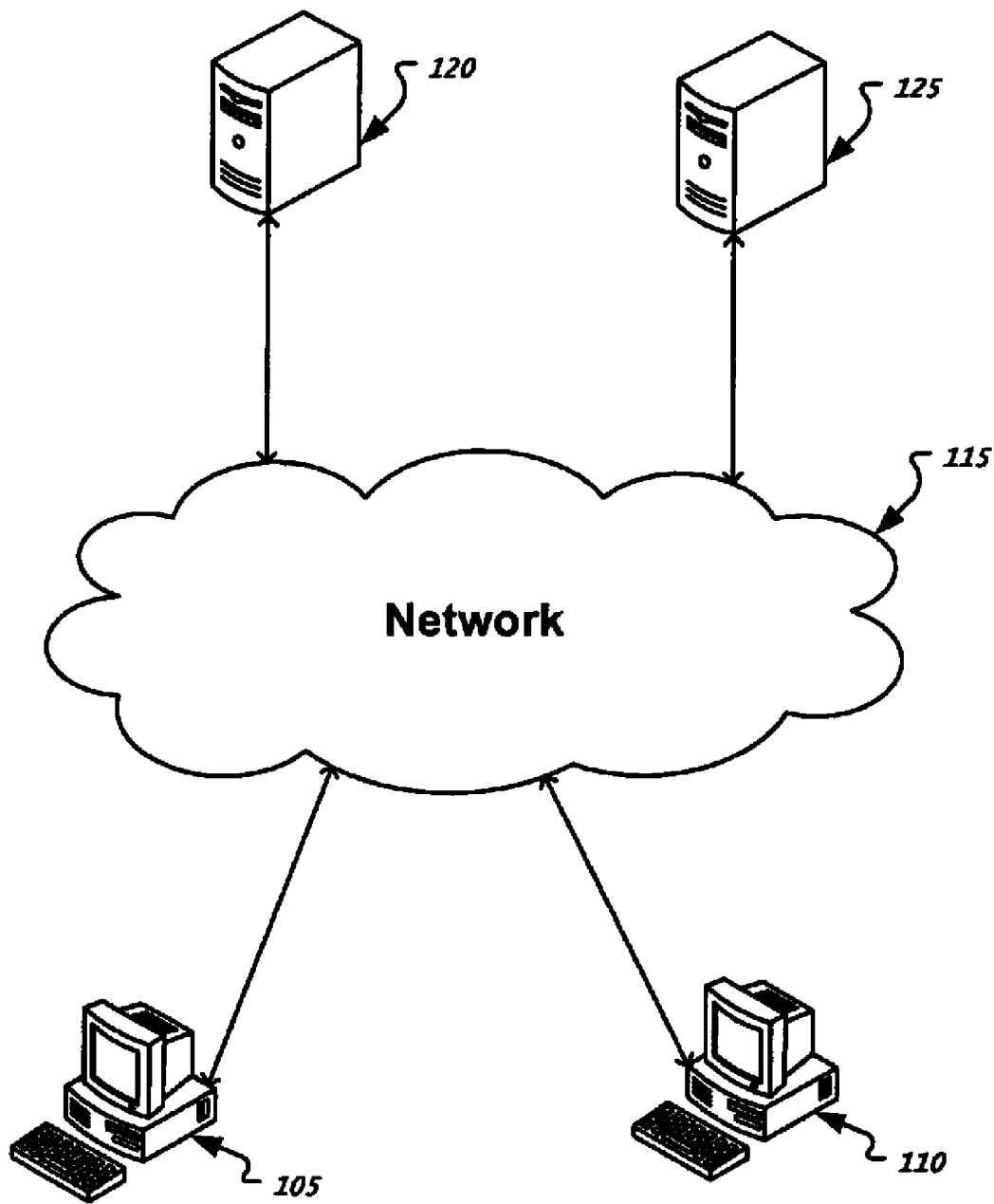
FIG. 1 shows an example of a communication network connected with computing devices.

FIG. 1 shows an example of a communication network connected with computing devices. Network endpoints 105, 110, 120, 125 can connect to a packet switched communication network 115 such as the Internet or a Local Area Network (LAN). Examples of endpoints 105, 110, 120, 125 can include computing devices such as a personal computer 105, 110 or a computer such as a server 120, 125. An endpoint can include one or more processors that can be programmed or configured to perform one or more operations mentioned in the present disclosure. In some implementations, a processor can include multiple processors or processor cores. A network endpoint can be identified as a client, a server, or both, but in any case, a network endpoint necessarily includes some hardware since it includes a physical device. Servers 120, 125 can establish connections with other servers 120, 125 or with computers 105, 110. Computers 105, 110 can establish connections with other computers 105, 110 or with servers 120, 125. In some implementations, the User Datagram Protocol (UDP) over Internet Protocol (IP) can transport messages to establish communications and send data between network endpoints 105, 110, 120, 125. In some implementations, a computer 105 can establish communications with a different computer 110 via a server 120. In some implementations, network endpoints can communicate with each other using RTMFP over UDP/IP. A network endpoint can run one or more applications that include support for RTMFP such as ADOBE® FLASH® Player and/or ADOBE® AIR ®, available from Adobe Systems Incorporated, of San Jose, Calif.

Two network endpoints may use multiple flows between each other to transmit different data. For example, two network endpoints can use one flow for Internet-based telephony, e.g., Voice over IP (VoIP), a different flow for multimedia streaming, and yet a different flow for file transfers. In some implementations, different priority levels are assigned to different flows. For example, a high or real-time priority level is assigned to the telephony flow, while a lower priority level is assigned to the multimedia flow, and an even lower priority level is assigned to the file transfer flow.

Some network protocols, such as TCP, may only support one flow per connection. Thus, multi-flow traffic between two network endpoints may use a separate connection for each of the flows between the two endpoints. In TCP implementations, each connection maintains a separate congestion window. Thus, multiple TCP connections between two network endpoints use multiple congestion windows. Separate congestion windows, and correspondingly separate adjustments thereof, can result in problems—especially when flows have different priority levels. For example, an aggressive increase in the congestion window for a file transfer flow may be detrimental to a high priority flow, e.g., a real-time data flow such as a VoIP flow.

On the other hand, some network protocols, such as Stream Control Transmission Protocol (SCTP) and RTMFP, can establish and maintain multiple flows between network endpoints over a single connection. In some implementations, a connection can be referred to as a session. Two network endpoints can establish one connection and establish one or more flows over the one connection as desired.

This specification describes technologies, among other things, to manage network congestion across multiple flows between two network endpoints under a single congestion window. Using a single congestion window for multiple flows between two endpoints may produce a better congestion response, a better usage of the network by one or more traffic classes, and a better usage of the network when other competing non-associated flows are transacting data, e.g., sending and/or receiving data.

Figure 2:
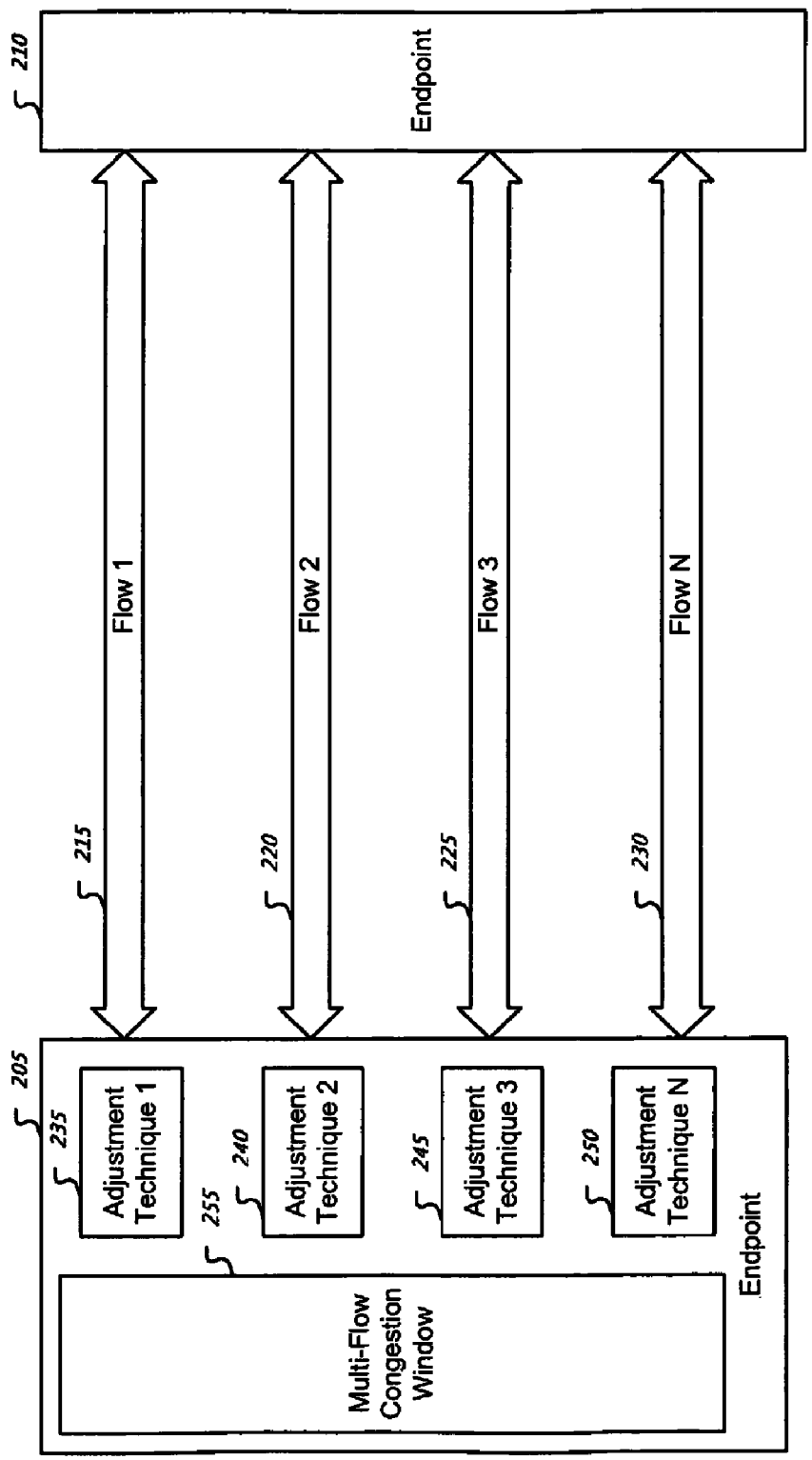
FIG. 2 shows an example of communications between two network endpoints using a multi-flow congestion window.

FIG. 2 shows an example of communications between two network endpoints using a multi-flow congestion window. A congestion window for multiple flows can be referred to as a multi-flow congestion window. Network endpoints 205, 210 can establish and communicate on multiple flows 215, 220, 225, 230 over a single connection between each other. Different endpoints 205, 210 can use different or similar approaches for congestion window adjustments. An endpoint 205 can assign different priority levels to different flows 215, 220, 225, 230. An endpoint 205 can use different congestion window adjustment techniques 235, 240, 245, 250 for corresponding different flows 215, 220, 225, 230 to adjust a multi-flow congestion window 255.

Examples of congestion window adjustment techniques can include one or more of: an additive increase to the congestion window for successful packet transmission, multiplicative increase to the congestion window for successful packet transmission, additive decrease to the congestion window for a packet loss, multiplicative decrease to the congestion window for a packet loss, reset the congestion window in response to a packet loss, and nonlinear increases/decreases to the congestion window. An adjustment technique can change depending on whether the flow is starting, e.g., ramping up transmissions, versus a well established flow, e.g., steady state. A high priority flow can trigger a more aggressive increase to the congestion window for successful packet transmission while a low priority flow, sharing a congestion window with the high priority flow, can trigger a less aggressive increase.

A congestion window adjustment technique is considered different from another technique if the outputs of the techniques differ for at least one input. In other words, a technique that uses multiplicative increase to expand the congestion window is considered different from a technique that uses additive increase. Further, two congestion window adjustment techniques, such as techniques based on AIMD, are different if the AIMD parameters are different. For example, AIMD with a multiplicative decrease factor of 0.5 is different from AIMD with a multiplicative decrease factor of 0.1.

In some implementations, a first congestion window adjustment technique can be similar to TCP's adjustment technique and can include TCP's slow-start mechanism. In some implementations, a second congestion window adjustment technique can skip slow-start and use a steady-state response at the beginning. In some implementations, a third congestion window adjustment technique can have a slower additive increase to the congestion window for successes and a more aggressive multiplicative decrease to the congestion window for losses than TCP. These three different congestion window adjustment techniques can map to three different priority levels.

Figure 3:
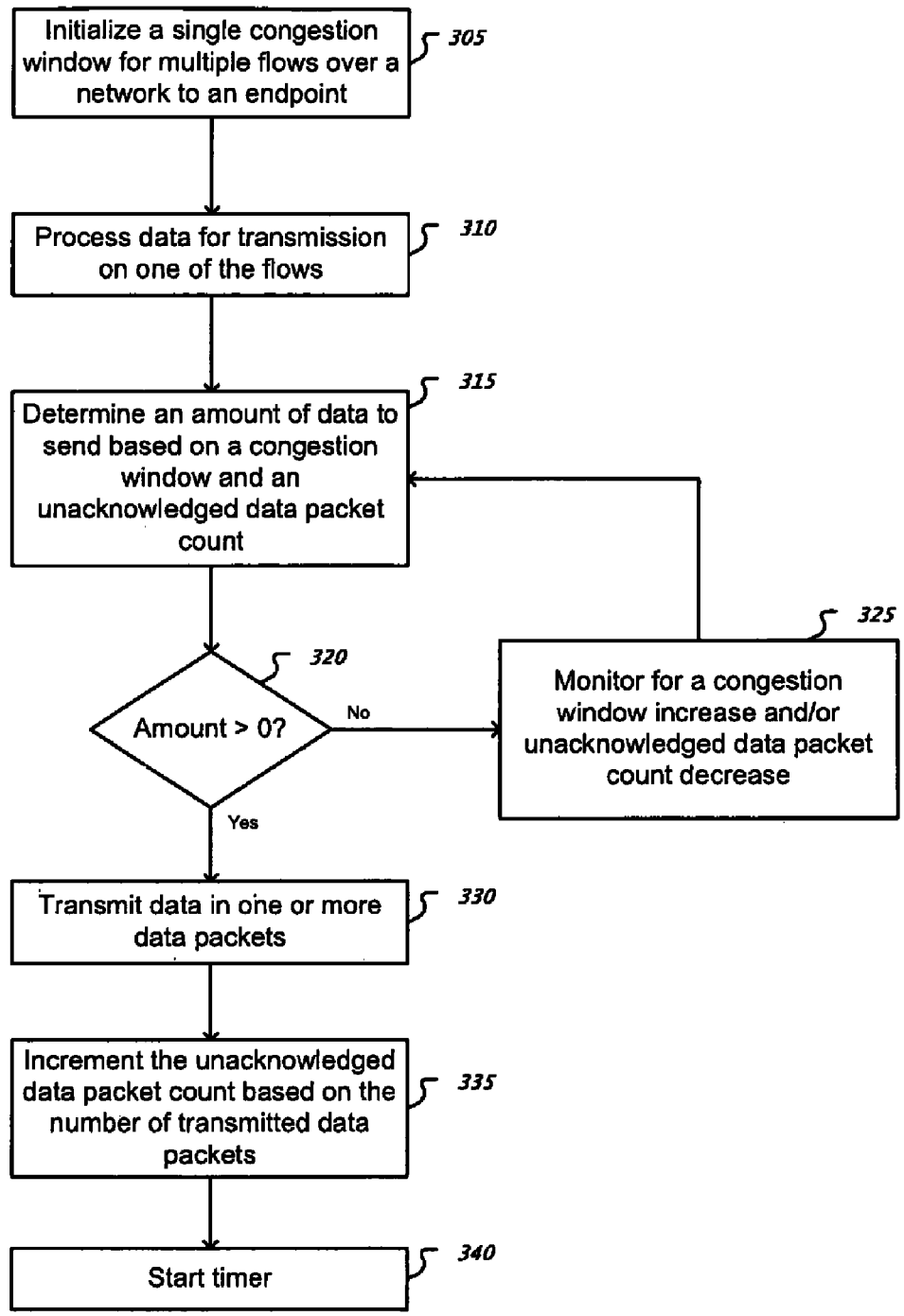
FIG. 3 shows an example of a technique to transmit data based on a congestion window for multiple flows.

FIG. 3 shows an example of a technique to transmit data based on a congestion window for multiple flows. A technique can initialize 305 a single congestion window for multiple flows over a network to an endpoint. In some implementations, the congestion window is expressed as a data amount such as in bytes. Once data is ready for transmission, the technique can process 310 data for transmission on one of the flows. The technique can determine 315 an amount of data to send based on a congestion window and an unacknowledged data packet count. For example, the amount of data to send can be based on the difference between the congestion window and an unacknowledged data packet count expressed as a data amount. If there has not been a previous transmission on any of the flows, the unacknowledged data packet count is zero. The technique can check 320 whether the amount is greater than zero, and if true, can transmit 330 data in one or more data packets in accordance with the determined amount of data, increment 335 the unacknowledged data packet count based on the number of transmitted data packets, and start 340 a timer for a monitoring technique that determines a delivery status of the transmitted data packets. Otherwise, the technique can monitor 325 for a congestion window increase and/or unacknowledged data packet count decrease, and can subsequently re-determine 315 an amount of data to send. In some cases, the outstanding amount of unacknowledged transmitted data packets can be zero, and accordingly, the full size of the congestion window is available for packet data transmissions. In some implementations, a flow can switch between priority levels during the flow's lifetime. For example, a low priority flow can transition to a high priority flow for one or more data segments that require a higher priority level.

Figure 4:
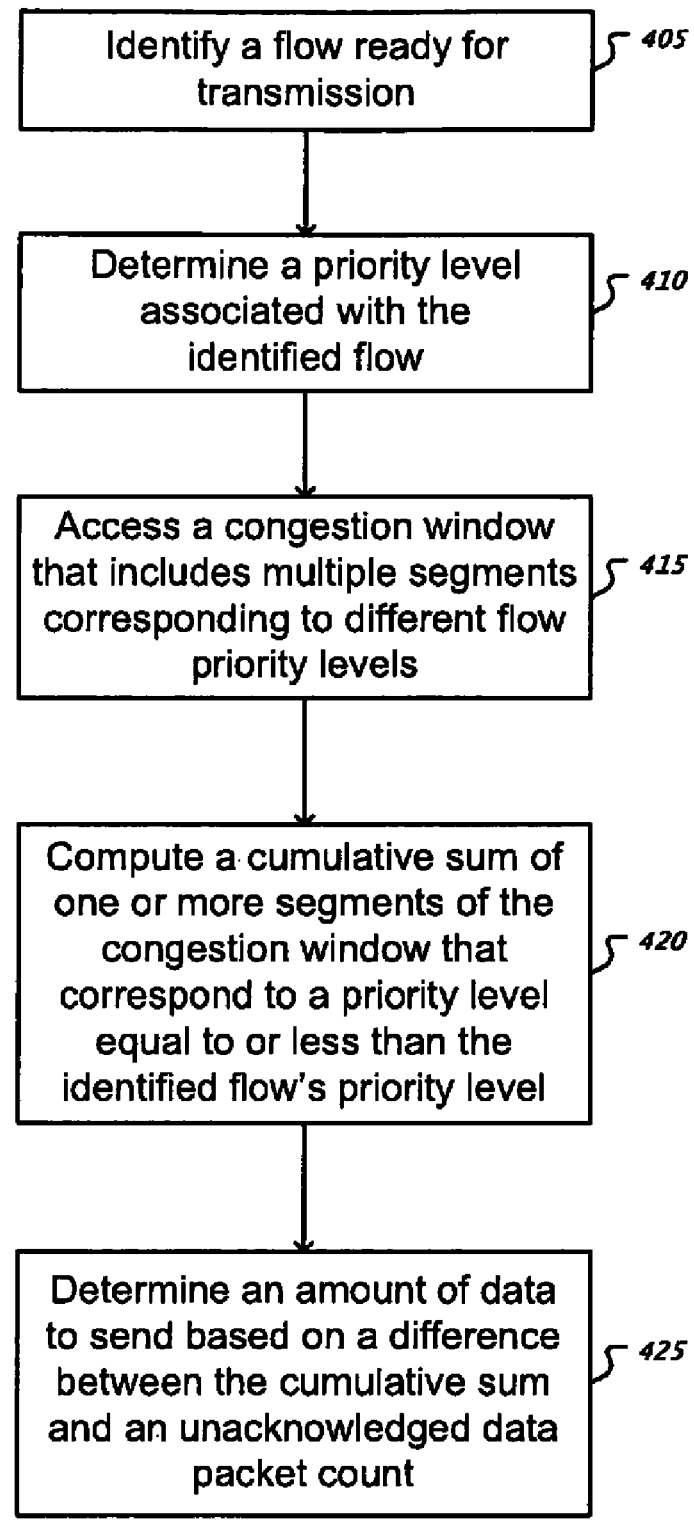
FIG. 4 shows an example of a technique to transmit data based on a congestion window that includes multiple segments.

FIG. 4 shows an example of a technique to transmit data based on a congestion window that includes multiple segments. The technique can identify 405 a flow ready for transmission. For example, a communication routine or process can handle data transmissions for multiple flows of a single connection. In some implementations, a communication routine or process detects that a flow is ready for transmission when an application associated with the flow sends data to the communication routine or process.

The technique can determine 410 a priority level associated with the identified flow. The technique can access a congestion window 415 that includes multiple segments corresponding to different flow priority levels. In some implementations, the segments of the congestion window are ordered by respective priority levels from lowest to highest.

The technique can compute 420 a cumulative sum of one or more segments of the congestion window that correspond to a priority level equal to or less than the identified flow's priority level. For example, if the identified flow's priority level is the lowest priority level, then the cumulative sum is equal to the lowest priority level congestion window segment. For another example, if the identified flow's priority level is the second lowest priority level, then the cumulative sum is equal to the sum of the first and second lowest priority level congestion window segments. For yet another example, if the identified flow's priority level is the highest priority level, then the cumulative sum is equal to the sum of all the congestion window segments.

After computing a cumulative sum, the technique can determine 425 an amount of data to send based on a difference between the cumulative sum and an unacknowledged data packet count expressed in a data amount. The technique can transmit flow data in accordance with the determined amount of data. In other words, more of the overall congestion window is available to higher priority flows than lower priority flows for some implementations based on a segmented congestion window.

Figure 5:
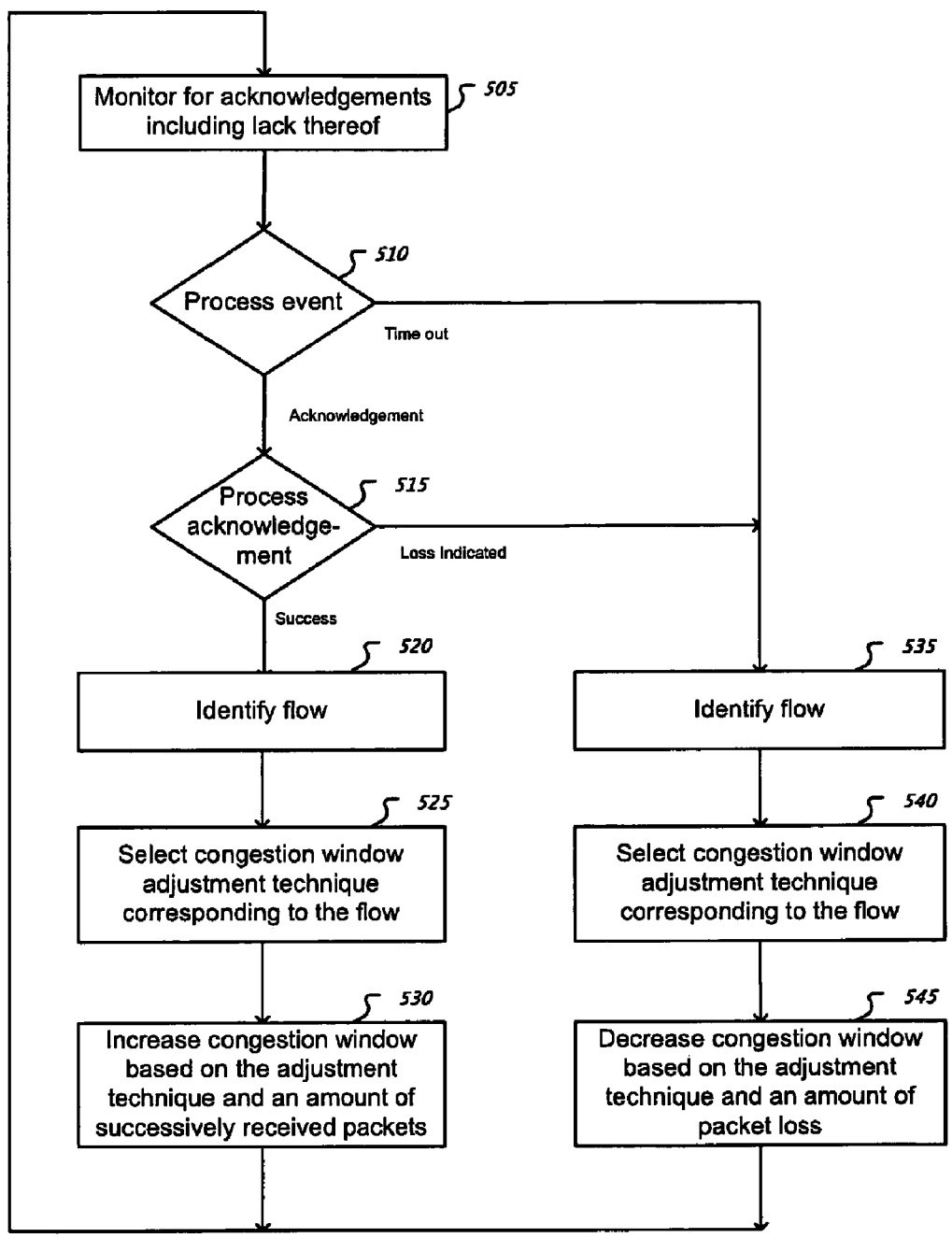
FIG. 5 shows an example of adjusting a congestion window.

FIG. 5 shows an example of adjusting a congestion window. After transmitting data packets, an endpoint can monitor for acknowledgements to determine whether the receiving endpoint has successfully received the data packets or has not received the data packets. An endpoint can monitor 505 for acknowledgements including lack thereof. Monitoring 505 can generate different events corresponding to different delivery statuses. The endpoint can process 510 an event to determine whether or not a time out occurred for a transmitted data packet or whether an endpoint received an acknowledgement. If an acknowledgement was received, the endpoint can process 515 the acknowledgement to determine whether the acknowledgement indicates a loss or a success.

If a success is indicated, the endpoint can identify 520 the flow corresponding to the acknowledgement. The endpoint can select 525 a congestion window adjustment technique corresponding to the identified flow. In some implementations, the acknowledgement can identify a data segment and the data segment can map to priority level, with the priority level mapped to a congestion window adjustment technique. The endpoint can increase 530 the congestion window based on the adjustment technique corresponding to the flow and an amount of successively received packets for that flow.

When a transmitted data packet is not received by the receiving endpoint, a timeout event can occur to signal the packet loss. Further, if the receiving endpoint receives a transmitted data packet out of order, e.g., the receiving endpoint has not received one or more packets that logically come before the received data packet, then the receiving endpoint can signal a potential loss by, for example, not acknowledging the out of order packet or acknowledging with the last received packet that was received in order. Such loss indications, e.g., processing 510 of a time out event or the processing of an acknowledgement that indicates a loss, can result in a series of actions to decrease the congestion window. For example, the endpoint can identify 535 the flow associated with the loss, can select 540 congestion window adjustment technique corresponding to the flow, and can decrease 545 the congestion window based on the adjustment technique and an amount of packet loss.

Some implementations can use a segmented congestion window and can adjust a segmented congestion window based on an adjustment technique corresponding to a segment of the congestion window. For example, a corresponding segment can be increased according to a corresponding adjustment technique based on a successful acknowledgement, but a packet loss can decrease the overall congestion window. In some implementations, decreasing a segmented congestion window can include proportional decreases to different segments, e.g., differing weights for different segments appropriate to a segment's associated priority level. The weights can be adjusted according to a combination of flows currently using the congestion window. In some implementations, an amount by which to decrease the overall congestion window can be computed, and the computed amount can be subtracted from the segments, starting at the lowest priority, until the computed amount has been fully subtracted. In some implementations, an amount to subtract from the congestion window can be computed according to the highest priority flow currently being used, or according to a combination of the differing priorities currently being used.

In some implementations, the associated adjustment techniques for the different priorities can take into account whether or not other priorities are currently being used. For example, one of the priority levels can use TCP's normal additive increase parameter and also use slow-start, unless high priority real-time data is also currently being sent, in which case slow-start can be disabled in order to keep the entire window more smooth.

Figure 6:
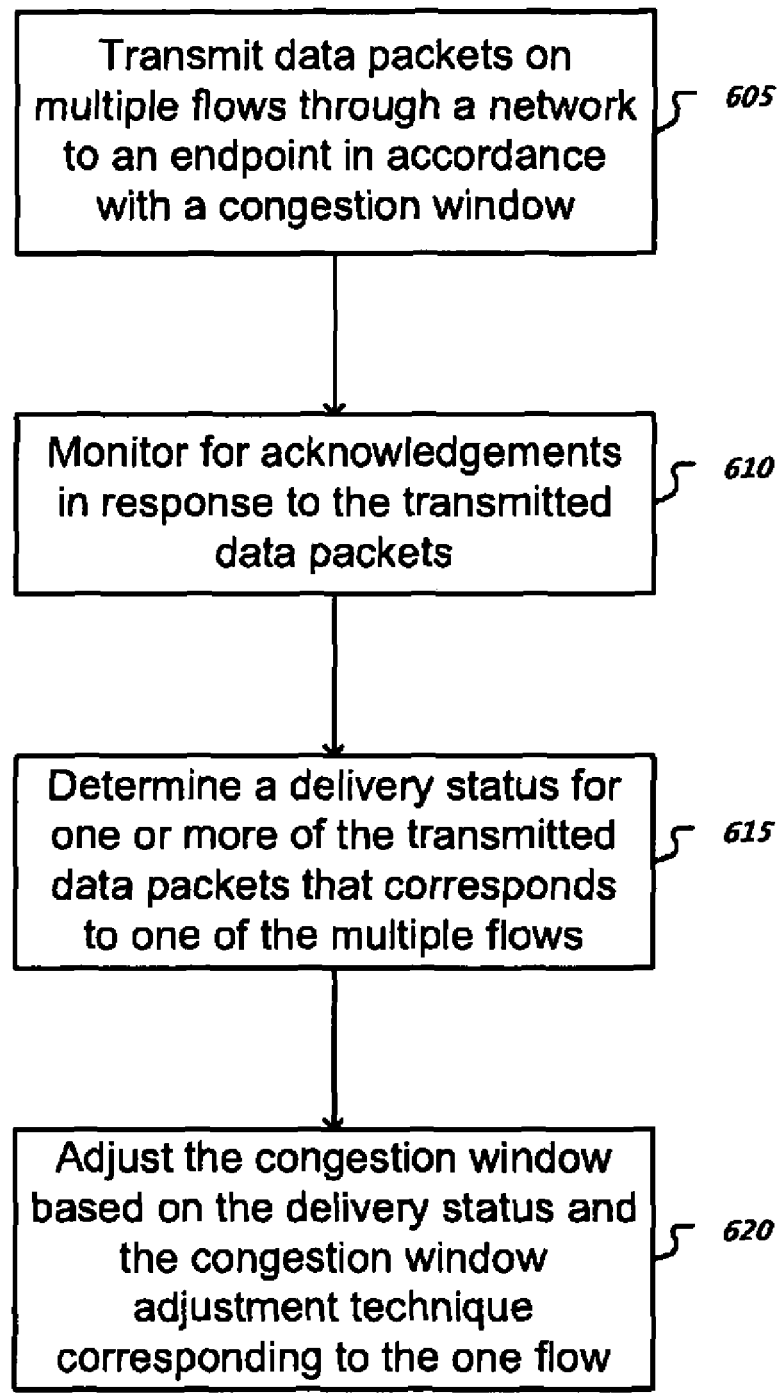
FIG. 6 shows an example of a technique to adjust a congestion window for multiple flows.

FIG. 6 shows an example of a technique to adjust a congestion window for multiple flows. The technique can transmit 605 data packets on multiple flows through a network to an endpoint in accordance with a congestion window. The congestion window can limit an outstanding amount of unacknowledged transmitted data packets. In some implementations, each flow is assigned to a different priority level for transmission and a corresponding different congestion window adjustment technique for use with that flow. Some implementations can use multiple priority levels with one or more flows assigned to each of the priority levels. The technique can monitor 610 for acknowledgements in response to the transmitted data packets. The technique can determine 615 a delivery status for one or more of the transmitted data packets that corresponds to one of the multiple flows. Determining 615 a delivery status can use a result of the monitoring 610 such as a number of successfully received packets for a specific flow or a number of lost data packets for a specific flow. The technique can adjust 620 the congestion window based on the delivery status and the congestion window adjustment technique corresponding to the one flow. Adjusting 620 the congestion window can include using a congestion window adjustment technique to produce an adjustment value based on an input that includes a number of successfully received packets or a number of lost data packets for a specific flow, and applying the adjustment value to the congestion window.

Figure 7:
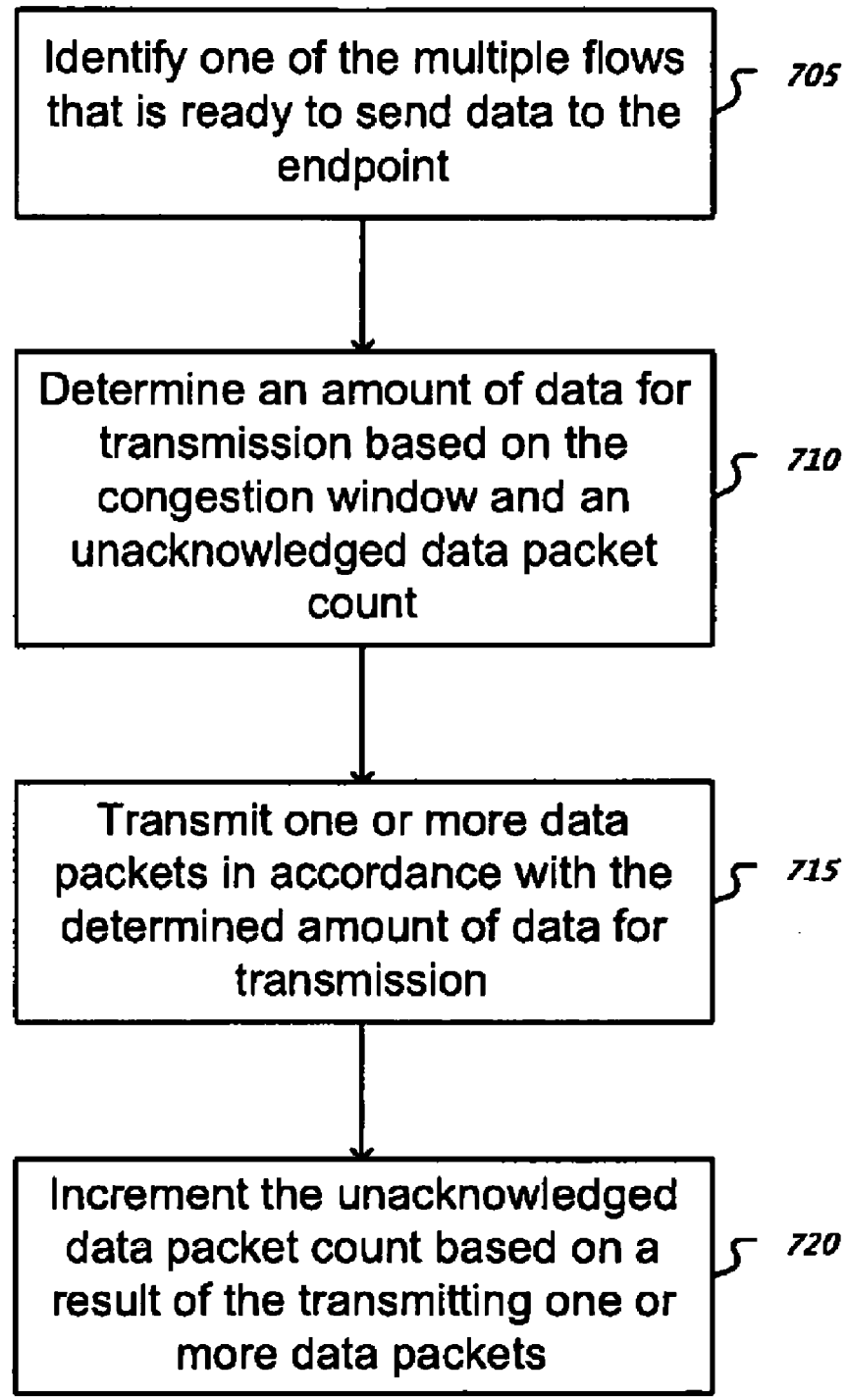
FIG. 7 shows a different example of a technique to transmit data.

FIG. 7 shows a different example of a technique to transmit data. The technique can identify 705 one of the multiple flows that is ready to send data to an endpoint and can determine 710 and amount of data for transmission. Determining 710 an amount of data for transmission can include comparing the congestion window with an unacknowledged data packet count. In some implementations, determining 710 the amount of data for transmission can include computing a sum of one or more segments of the congestion window that correspond to a priority level equal to or less than the identified flow's priority level. In some cases, a flow can have an amount of data ready for transmission that exceeds or falls short of the determined amount of data for transmission. The technique can transmit 715 one or more data packets in accordance with the determined amount of data for transmission. In some implementations, the technique can increment 720 the unacknowledged data packet count based on a result of the transmitting 715 one or more data packets.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   transmitting data packets on multiple flows through a network to an endpoint in accordance with a congestion window, each flow assigned a different priority level for transmission and a corresponding different congestion window adjustment technique for use with that flow, wherein the congestion window limits an outstanding amount of unacknowledged transmitted data packets for all of the multiple flows to the endpoint;
   monitoring for acknowledgements in response to the transmitted data packets;
   determining, based on a result of the monitoring, a delivery status for one or more of the transmitted data packets that corresponds to one of the multiple flows; and
   adjusting, responsive to the determined delivery status for the one flow, the congestion window based on the delivery status and the congestion window adjustment technique corresponding to the one flow.

2. The method of claim 1, wherein adjusting the congestion window comprises adjusting a segment of the congestion window associated with the one flow, wherein the congestion window comprises multiple segments corresponding to different priority levels.

3. The method of claim 1, further comprising:
   identifying one of the multiple flows that is ready to send data to the endpoint;
   determining an amount of data for transmission based on the congestion window and an unacknowledged data packet count;
   transmitting one or more data packets, each comprising data associated with the identified flow, in accordance with the determined amount of data for transmission; and
   incrementing the unacknowledged data packet count based on a result of the transmitting one or more data packets.

4. The method of claim 3, wherein determining the amount of data for transmission comprises computing a sum of one or more segments of the congestion window that correspond to a priority level equal to or less than the identified flow's priority level, wherein the congestion window comprises multiple segments corresponding to different priority levels.

5. The method of claim 1, wherein transmitting data packets on multiple flows comprises transmitting data based on a User Datagram Protocol (UDP).

6. The method of claim 5, wherein transmitting data packets on multiple flows comprises transmitting data in accordance with a Real-Time Media Flow Protocol (RTMFP).

7. The method of claim 1, wherein transmitting data packets on multiple flows comprises transmitting data packets on three or more flows, wherein adjusting the congestion window comprises using three or more different congestion window adjustment techniques to effect adjustments to the congestion window, wherein the three or more flows respectively map to the three or more different congestion window adjustment techniques.

8. A non-transitory computer storage medium encoded with a computer program, the program comprising instructions that when executed by data processing apparatus cause the data processing apparatus to perform operations comprising:

transmitting data packets on multiple flows through a network to an endpoint in accordance with a congestion window, each flow assigned a different priority level for transmission and a corresponding different congestion window adjustment technique for use with that flow, wherein the congestion window limits an outstanding amount of unacknowledged transmitted data packets for all of the multiple flows to the endpoint;

monitoring for acknowledgements in response to the transmitted data packets;

determining, based on a result of the monitoring, a delivery status for one or more of the transmitted data packets that corresponds to one of the multiple flows; and adjusting, responsive to the determined delivery status for the one flow, the congestion window based on the delivery status and the congestion window adjustment technique corresponding to the one flow.

9. The computer storage medium of claim 8, wherein adjusting the congestion window comprises adjusting a segment of the congestion window associated with the one flow, wherein the congestion window comprises multiple segments corresponding to different priority levels.

10. The computer storage medium of claim 8, the operations further comprising:

identifying one of the multiple flows that is ready to send data to the endpoint;

determining an amount of data for transmission based on the congestion window and an unacknowledged data packet count;

transmitting one or more data packets, each comprising data associated with the identified flow, in accordance with the determined amount of data for transmission; and incrementing the unacknowledged data packet count based on a result of the transmitting one or more data packets.

11. The computer storage medium of claim 10, wherein determining the amount of data for transmission comprises computing a sum of one or more segments of the congestion window that correspond to a priority level equal to or less than the identified flow's priority level, wherein the congestion window comprises multiple segments corresponding to different priority levels.

12. The computer storage medium of claim 8, wherein transmitting data packets on multiple flows comprises transmitting data based on a User Datagram Protocol (UDP).

13. The computer storage medium of claim 12, wherein transmitting data packets on multiple flows comprises transmitting data in accordance with a Real-Time Media Flow Protocol (RTMFP).

14. The computer storage medium of claim 8, wherein transmitting data packets on multiple flows comprises transmitting data packets on three or more flows, wherein adjusting the congestion window comprises using three or more different congestion window adjustment techniques to effect adjustments to the congestion window, wherein the three or more flows respectively map to the three or more different congestion window adjustment techniques.

15. A system comprising:

a first endpoint comprising at least one processor and at least one memory device; and a second endpoint comprising at least one processor and at least one memory device, the second endpoint in communication with the first endpoint, wherein the second endpoint is configured to perform operations comprising:

transmitting data packets on multiple flows to the first endpoint in accordance with a congestion window, each flow assigned a different priority level for transmission and a corresponding different congestion window adjustment technique for use with that flow, wherein the congestion window limits an outstanding amount of unacknowledged transmitted data packets for all of the multiple flows to the endpoint;

monitoring for acknowledgements in response to the transmitted data packets;

determining, based on a result of the monitoring, a delivery status for one or more of the transmitted data packets that corresponds to one of the multiple flows; and adjusting, responsive to the determined delivery status for the one flow, the congestion window based on the delivery status and the congestion window adjustment technique corresponding to the one flow.

16. The system of claim 15, wherein adjusting the congestion window comprises adjusting a segment of the congestion window associated with the one flow, wherein the congestion window comprises multiple segments corresponding to different priority levels.

17. The system of claim 15, the operations further comprising:

identifying one of the multiple flows that is ready to send data to the endpoint;

determining an amount of data for transmission based on the congestion window and an unacknowledged data packet count;

transmitting one or more data packets, each comprising data associated with the identified flow, in accordance with the determined amount of data for transmission; and incrementing the unacknowledged data packet count based on a result of the transmitting one or more data packets.

18. The system of claim 17, wherein determining the amount of data for transmission comprises computing a sum of one or more segments of the congestion window that correspond to a priority level equal to or less than the identified flow's priority level, wherein the congestion window comprises multiple segments corresponding to different priority levels.

19. The system of claim 15, wherein transmitting data packets on multiple flows comprises transmitting data based on a User Datagram Protocol (UDP).

20. The system of claim 15, wherein transmitting data packets on multiple flows comprises transmitting data packets on three or more flows, wherein adjusting the congestion window comprises using three or more different congestion window adjustment techniques to effect adjustments to the congestion window, wherein the three or more flows respectively map to the three or more different congestion window adjustment techniques.

* * * * *